United States Patent
Zhou et al.

(10) Patent No.: US 11,333,826 B2
(45) Date of Patent: May 17, 2022

(54) SILICON-BASED INTEGRATED OPTICALLY ADJUSTABLE DELAY LINE BASED ON OPTICAL PHASED ARRAY

(71) Applicant: Shanghai Jiao Tong University, Shanghai (CN)

(72) Inventors: Linjie Zhou, Shanghai (CN); Wensheng Shan, Shanghai (CN); Weihan Xu, Shanghai (CN); Liangjun Lu, Shanghai (CN); Jianping Chen, Shanghai (CN); Jiao Liu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 51 days.

(21) Appl. No.: 17/039,964

(22) Filed: Sep. 30, 2020

(65) Prior Publication Data

US 2021/0026068 A1 Jan. 28, 2021

Related U.S. Application Data

(63) Continuation of application No. PCT/CN2019/084791, filed on Apr. 28, 2019.

(30) Foreign Application Priority Data

Dec. 14, 2018 (CN) .......................... 201811531401.4

(51) Int. Cl.
*G02B 6/12* (2006.01)
*G02B 6/124* (2006.01)
*G02F 1/29* (2006.01)

(52) U.S. Cl.
CPC ......... *G02B 6/12009* (2013.01); *G02B 6/124* (2013.01); *G02F 1/292* (2013.01);
(Continued)

(58) Field of Classification Search
CPC ................ G02B 6/12009; G02B 6/124; G02B 2006/12107; G02B 2006/12038; G02F 1/292
See application file for complete search history.

(56) References Cited

U.S. PATENT DOCUMENTS 5,572,611 A * 11/1996 Jinguji ............... G02B 6/12007
385/17
6,122,419 A * 9/2000 Kurokawa ......... G02B 6/12007
372/77
(Continued)

FOREIGN PATENT DOCUMENTS

| CN | 101980460 A | 2/2011 |
| CN | 103091776 A | 5/2013 |

(Continued)

*Primary Examiner* — Ryan A Lepisto
*Assistant Examiner* — Erin D Chiem
(74) *Attorney, Agent, or Firm* — Mei & Mark LLP; Manni Li

(57) ABSTRACT

A silicon- and optical phased array-based integrated optically adjustable delay line, comprising, an optical phased array transmitting unit, a slab waveguide transmitting unit, and an optical phased array receiving unit that are sequentially arranged. By the optical phase control transmitting unit, the phase difference between channels is regulated and controlled via a phase shifter to change a far-field interference light spot and form a wave beam with directivity to regulate and control an incident angle of an optical signal entering the slab waveguide, thus changing the propagation path length of the optical signal. Finally, the optical signal is received by a corresponding optical phased array receiving unit to obtain different delay amounts. Large adjustable delay amount is realized and the delay line has the advantages of simple structure and control and high integration level with high application value in optical communication and microwave photonic and optical signal processing.

10 Claims, 5 Drawing Sheets

(52) U.S. Cl.
CPC ......... *G02B 2006/12038* (2013.01); *G02B 2006/12107* (2013.01)

(56) References Cited

U.S. PATENT DOCUMENTS

| | | | | |
|---|---|---|---|---|
| 6,834,152 | B2* | 12/2004 | Gunn, III | G02B 6/132 |
| | | | | 385/130 |
| 6,956,998 | B2* | 10/2005 | Shahar | G02B 6/125 |
| | | | | 385/31 |
| 7,082,235 | B2* | 7/2006 | Gunn, III | G02B 6/1228 |
| | | | | 385/28 |
| 10,075,245 | B2* | 9/2018 | Caplan | H04B 10/677 |
| 10,429,582 | B1* | 10/2019 | Bian | G02B 6/125 |

FOREIGN PATENT DOCUMENTS

| | | |
|---|---|---|
| CN | 105527772 A | 4/2016 |
| JP | 2003021814 A | 1/2003 |

* cited by examiner

SILICON-BASED INTEGRATED OPTICALLY ADJUSTABLE DELAY LINE BASED ON OPTICAL PHASED ARRAY

CROSS-REFERENCE TO RELATED APPLICATIONS

The subject application is a continuation of PCT/CN2019/084791 filed on Apr. 28, 2019, which claims priority on Chinese Application No. CN201811531401.4 filed on Dec. 14, 2018 in China. The contents and subject matter of the PCT international application and Chinese priority application are incorporated herein by reference.

TECHNICAL FIELD

The present invention belongs to the field of optical delay and optical buffering, particularly, an optical phased array transmitting and receiving unit and a transmission waveguide that are combined to form an angle-adjustable optical path by means of the optical phased array and different delay amounts obtained by multiple total reflection transmission in the waveguide so that an integrated adjustable optical delay line is realized.

BACKGROUND ART

Data buffer is a key unit in optical communication networks. It avoids the problem of channel network collision, improves network node throughput, and reduces packet loss rate. In the next generation all-optical switching networks, such as packet switching, the performance requirements for data buffering are higher. Prior optical switching networks use random-access memory (RAM) to access information. The optical switching speed of the method is limited by the reading speed of RAM. Meanwhile, optical-to-electrical (O/E) and electrical-to-optical (E/O) conversions are required in the solution, so that the system is relatively complex and the electrical power consumption of the system is relatively large. Accordingly, people begin to consider whether the data buffering function can be performed directly in an optical system without the O/E and E/O conversions. Unfortunately, there has not been a mature and feasible optical storage solution or device. Therefore, existing optical systems for data buffering and synchronization functions are implemented by means of various adjustable optical delay lines.

There are three methods to adjust the delay amount of a device: (1) changing an effective refractive index of a medium; (2) changing dispersion of the effective refractive index of the medium, namely adjusting a group refractive index; and (3) changing the length of the medium.

The limitation of the first method is relatively large, because the effective refractive index of the medium is related to the refractive index of the material of the device and the waveguide structure; the changeable range is generally small, and the optical absorption loss of the material itself should be considered when the medium is selected, so that the method is hardly adopted.

The second method has the best adjustability and can realize continuous adjustment. It can realize material dispersion or waveguide dispersion by using the principles of electro-optic effect, thermo-optic effect or carrier dispersion effect of materials. However, the method is also limited, large dispersion often accompanies signal distortion, and limits the working bandwidth of the device, which is not conducive to the application in high-speed systems. Therefore, the delay adjustment range achieved by this method tends to be small.

The third method is the most straightforward and may not be limited by the material properties of the medium. However, since the delay amount is proportional to the length of the waveguide and due to the problems of loss, system complexity and the like, the size of the device cannot be increased infinitely, and the performance such as the delay adjustment range and loss of the device is required to be optimized by a reasonable design. The dynamic adjustment of this method usually relies on optical switches and other devices for routing, so how to implement high performance optical switches is also one of the difficulties to consider.

SUMMARY OF THE INVENTION

In view of the disadvantages of the above-mentioned three optical delay modes, the present invention provides an optical phased array (OPA) to generate an angle-adjustable light beam for transmission in a waveguide according to different paths, thereby realizing flexible adjustment to the delay amount of an optical signal. To solve the problems of the existing technologies, the present invention provides an integrated optically adjustable delay line based on an optical phased array. In the present invention, a beam with directivity is formed by optical phased array beam forming, an incident angle of an optical signal entering a waveguide is regulated and controlled, changing a propagation path of the optical signal, and finally different delay amounts are obtained. Specifically, the invention can realize large adjustable delay amounts, has the advantages of simple structure and control, high integration level, flexible adjustment and the like. It has extremely high application value in optical communication, microwave photonic and optical signal processing.

To achieve the above object, the technical solution of the present invention provides an integrated optically adjustable delay line based on an optical phased array which is characterized in that the integrated optically adjustable delay line comprises an optical phased array transmitting unit, a slab waveguide transmitting unit and an optical phased array receiving unit; and the optical phased array transmitting/receiving units include, but are not limited to, couplers, optical splitters, phase shifters, waveguide array antennas, and the like.

In the present invention, the optical phased array transmitting unit transmits a wave beam having directivity by beam forming and is connected to one end of the slab waveguide transmitting unit; an input light beam larger than a total reflection critical angle is constrained to be transmitted in the waveguide; the other end of the waveguide is connected to the optical phased array receiving unit; according to an optical path reversibility principle, the receiving end can receive an optical signal transmitted from a specific direction in the waveguide so as to establish the optical path from the input end to the output end.

In the present invention, the integrated optically adjustable delay line is characterized in that the optical delay is adjustable by changing the angle of the transmit/receive beam of the optical phased array and the length of the propagation path of the light beam in the slab waveguide.

In the present invention, the integrated optically adjustable delay line is characterized in that the optical phased array transmit/receiver may be arranged symmetrically with respect to the transmission waveguide, or the phased array transmit/receiver may be arranged at the same side of the waveguide.

In the present invention, the integrated optically adjustable delay line is characterized in that an input coupler of the optical phased array can be a grating coupler, an inverted taper, or the like. The optical signal input/output adopts horizontal coupling or vertical coupling to realize connection between an external optical signal and a planar optical waveguide, the horizontal coupling adopts a lens fiber, and an inverted cone spot-size converter on the chip, and the vertical coupling adopts a planar optical fiber, and a grating coupler on the chip.

In the present invention, a beam splitter of the optical phased array adopts a structure including, but not limited to, a cascaded multimode interference coupler, a cascaded Y-junction based beam splitter, a star coupler and the like to realize uniform distribution of input light among a plurality of phase channels.

In the present invention, the phase shifter may employ a phase shifter based on a free carrier dispersion effect (FCD) or a phase shifter based on a thermo-optic effect (TO) that modulates the phase of the optical signal on each array waveguide by changing an effective refractive index of the waveguide.

In the present invention, the optical phased array has an antenna with a sub-wavelength spacing density to enable a large angular range of non-aliased light beam deflection, and the transmit array adopts a structure including, but not limited to, a curved waveguide array, a waveguide array with different widths, a photonic bandgap containing a mimic metamaterial/metamaterial and the like, so that coupling crosstalk of optical signals in the waveguide array antenna is inhibited.

According to the light beam transmission waveguide in the present invention, the light beam is limited in the waveguide by a total reflection principle; wherein a core layer is made of silicon material, a cladding layer is made of silicon dioxide or air, and an interface between the core layer and the cladding layer is smooth and clean to reduce total reflection loss.

In the present invention, the optical phased array receiving unit has a mirror image structure with the transmitting unit, and adopt different array sizes, sub-channel numbers, sub-channel phase adjusting principles, beam combining devices, output couplers and the like.

In the present invention, the optical phased array transmitter/receiver may, but is not limited to, improve reception efficiency by increasing an array size of the receiver or the number of sub-channels.

Compared with the existing technology, the present invention has the beneficial effects mainly embodied in the following aspects.

1. According to the present invention, an integrated optical phased array is adopted as a transmitting end of a signal to generate a highly directional light beam, and a propagation path of a light beam in a waveguide can be changed by adjusting an applied voltage.

2. The waveguide used in the present invention has a large size to provide an optical delay with low loss and low dispersion. The optical path of the light beam transmitted in the waveguide can be flexibly adjusted. Compared with a traditional optical delay line, the structure can provide a wide range of delay amount adjustment by virtue of a fixed waveguide length and width.

3. The present invention is simple in structure and convenient to control. All the system components adopt silicon-based substrates to realize single-chip integration. It has the advantages of compact structure, flexible adjustment, simple control and the like. Meanwhile, the manufacturing process of the silicon-based integrated optical delay chip is compatible with the CMOS process, which is favorable for mass production and has the potential advantage of low cost.

DETAILED DESCRIPTION OF THE INVENTION

Figure 1:
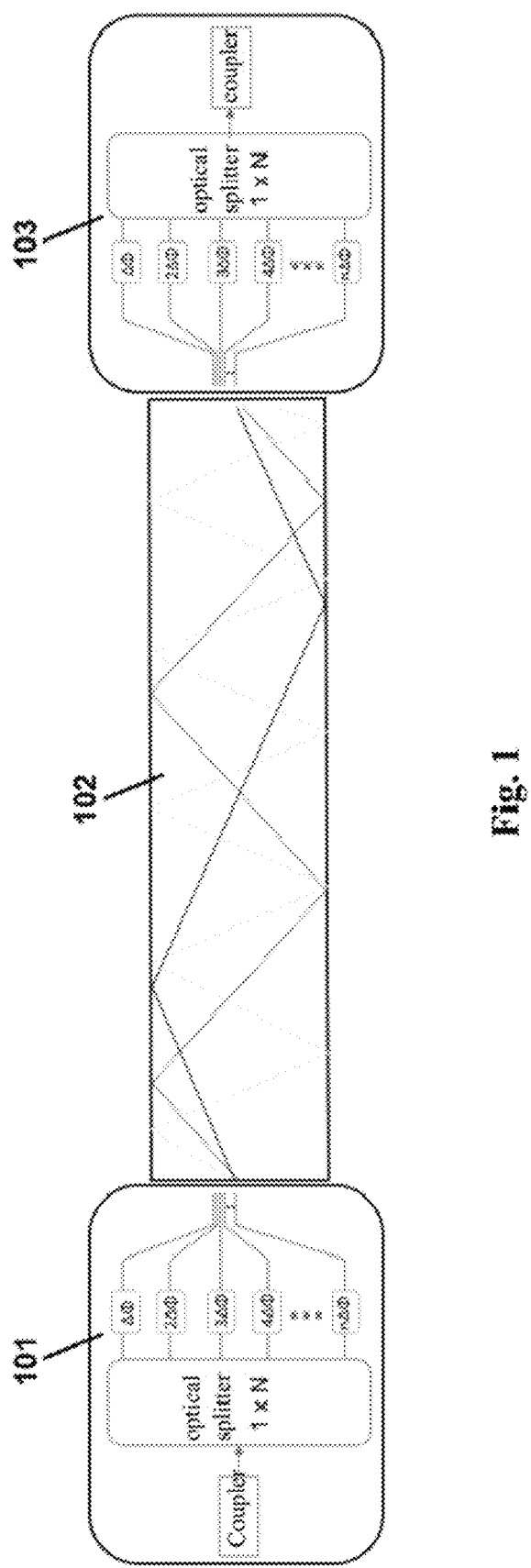
FIG. 1 shows the structure of the optical phased array transmitter/receiver arranged oppositely to each other in one embodiment of the present invention.

The present invention is described in further detail with reference to the accompanying drawings and embodiments, yet they do not limit the scope of protection.

The silicon-based and an optical phased array-based integrated optically adjustable delay line of the present invention comprises an optical phased array transmitting unit (101) comprising an output end, a slab waveguide transmitting unit (102) comprising a first end and a second end, and an optical phased array receiving unit (103); wherein the output end of the optical phased array transmitting unit (101) is connected with the first end of the slab waveguide transmitting unit (102), and the second end of the slab waveguide transmitting unit (102) is connected with the optical phased array receiving unit (103); the optical phased array transmitting unit (101) is sequentially composed of a coupler, a cascaded beam splitting structure, and a phase shifter phase array; and the optical phased array receiving unit (103) is sequentially composed of a phase shifter phase array, a cascaded beam splitting structure, and a coupler.

In the integrated optically adjustable delay line of the present invention, the optical phased array transmitting unit (101) and the optical phased array receiving unit (103) are arranged symmetrically with respect to the slab waveguide transmitting unit (102) or at the same side of the slab waveguide transmitting unit (102).

The optical phased array transmitting unit (101) transmits a wave beam having directivity by beam forming and is connected to the first end of the slab waveguide transmitting unit (102); an input light beam larger than a total reflection critical angle is constrained to be transmitted in the slab waveguide transmitting unit (102); the other end of the slab waveguide transmitting unit (102) is connected to the optical phased array receiving unit (103); and according to an optical path reversibility principle, the second end of the slab waveguide transmitting unit (102) receives an optical signal transmitted from a specific angle in the slab waveguide transmitting unit (102) so as to complete a connection of the optical path from the input to the output. The principle of light path reversibility refers to that, if light starts from point A and can reach point B in the medium, then when light starts from point B, it can go back to point A through the same path. Further, the specific angle refers to the angle of light that can be transmitted in the slab waveguide. The beam steering angle of 101 and 103 is the same specific angle.

The present invention further provides a method for adjusting light delay using the integrated optically adjustable delay line, comprising the steps of regulating a phase difference between channels by the phase shifter phase array of the optical phased array transmitting unit (101) or the optical phased array receiving unit (103) to change a far-field interference light spot and forming a wave beam with directivity, changing an angle of a light beam of the optical phased array transmitting unit (101) or the optical phased array receiving unit (103), changing a length of a propagation path of the light beam in the slab waveguide; and adjusting the light delay.

In the integrated optically adjustable delay line of the present invention, an input coupler of the optical phased array of the optical phased array transmitting unit (101) or the optical phased array receiving unit (103) adopts a grating coupler or an inverse taper, and an external signal that is an input and output through the coupler in the optical phased array transmitting unit (101) or the optical phased array receiving unit (103) adopts horizontal coupling or vertical coupling to realize a connection between an external optical signal and a planar optical waveguide; and the horizontal coupling adopts a lens, and an inverted cone spot-size converter on a chip, and the vertical coupling adopts a planar optical fiber, and a grating coupler on the chip.

In the present invention, the cascaded beam splitting structure of the optical phased array transmitting unit (101) is a beam splitter that employs a cascaded multimode interference coupler, a cascaded Y-beam splitter, or a star coupler.

In the present invention, the phase shifter of the optical phased array transmitting unit (101) or of the optical phased array receiving unit (103) adopts a phase shifter based on a free carrier dispersion effect or a phase shifter based on a thermo-optic effect.

In the present invention, the optical phased array has a sub-wavelength spaced antenna density to enable a large angular range of non-aliased light beam deflection, and the transmit array uses a curved waveguide array, a waveguide array of different widths, or a photonic bandgap structure containing metamaterials to enable coupling suppression between transmit units.

In the present invention, the optical phased array receiving unit comprises a mirror image structure with the optical phased array transmitting unit, and uses different array size, sub-channel number, sub-channel phase adjusting principle, beam combining device, output coupler, or a combination thereof from the optical phased array transmitting unit.

The present invention further provide a method for increasing receiving efficiency or receiving integrated of the optically adjustable delay line comprises increasing an array size of a receiver or the number of sub-channels in the optical phased array receiving unit (103).

Figure 2:
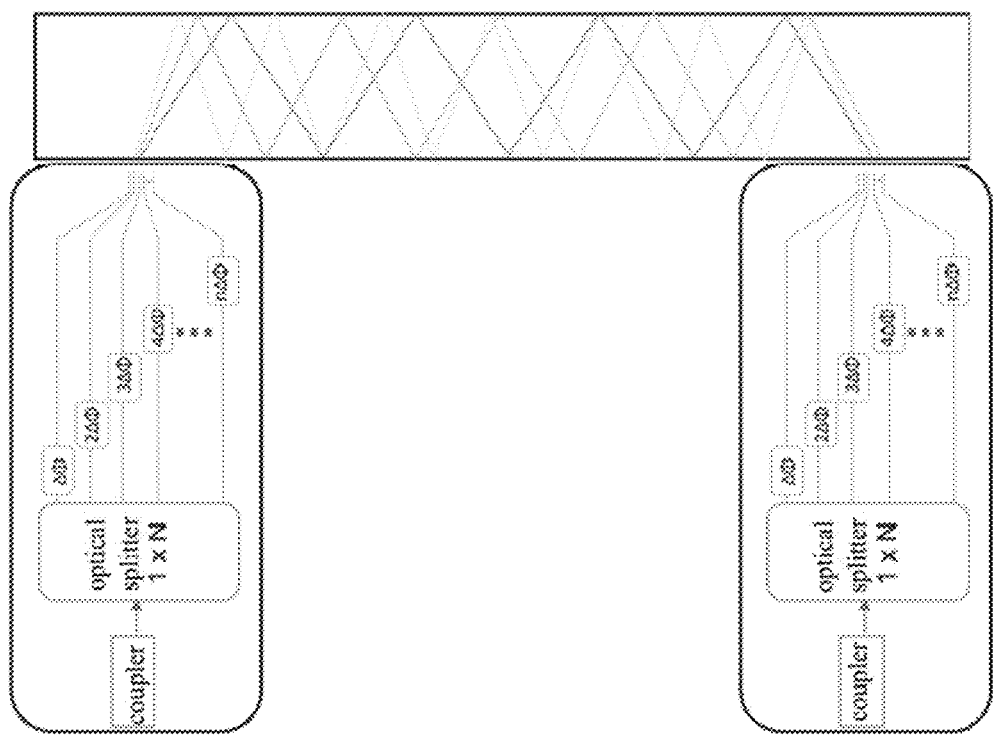
FIG. 2 shows the structure of the optical phased array transmitter/receiver arranged at the same side in another embodiment of the present invention.

As shown in FIGS. 1 and 2, an integrated adjustable delay line based on an optical phased array is mainly divided into three parts according to functional characteristics: an optical phased array transmitting unit (101), a slab waveguide transmitting unit (102) and an optical phased array receiving unit (103); the optical phased array transmitting unit (101) is sequentially composed of a coupler, a cascaded light splitting structure and a phase shifter phase array from left to right, respectively represented by "a coupler, a light splitter 1×N and a multi-channel waveguide with a fixed phase difference $\Delta\Phi$" in the unit (101) of FIG. 1. The optical phased array receiving unit (103) is sequentially composed of a phase shifter phase array, a cascaded light splitting structure and a coupler from left to right. The component structures are the same as the component structures in the optical phased array transmitting unit, but arranged in different orders.

Figure 3A:
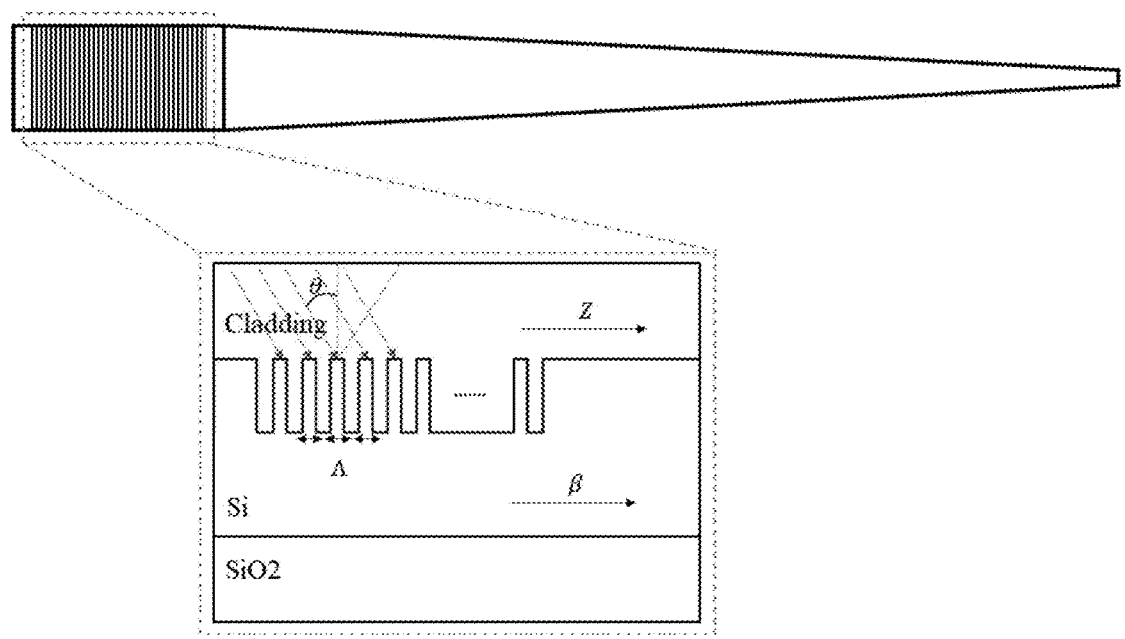
FIG. 3A shows the vertical grating coupler in the present invention.
Figure 3B:
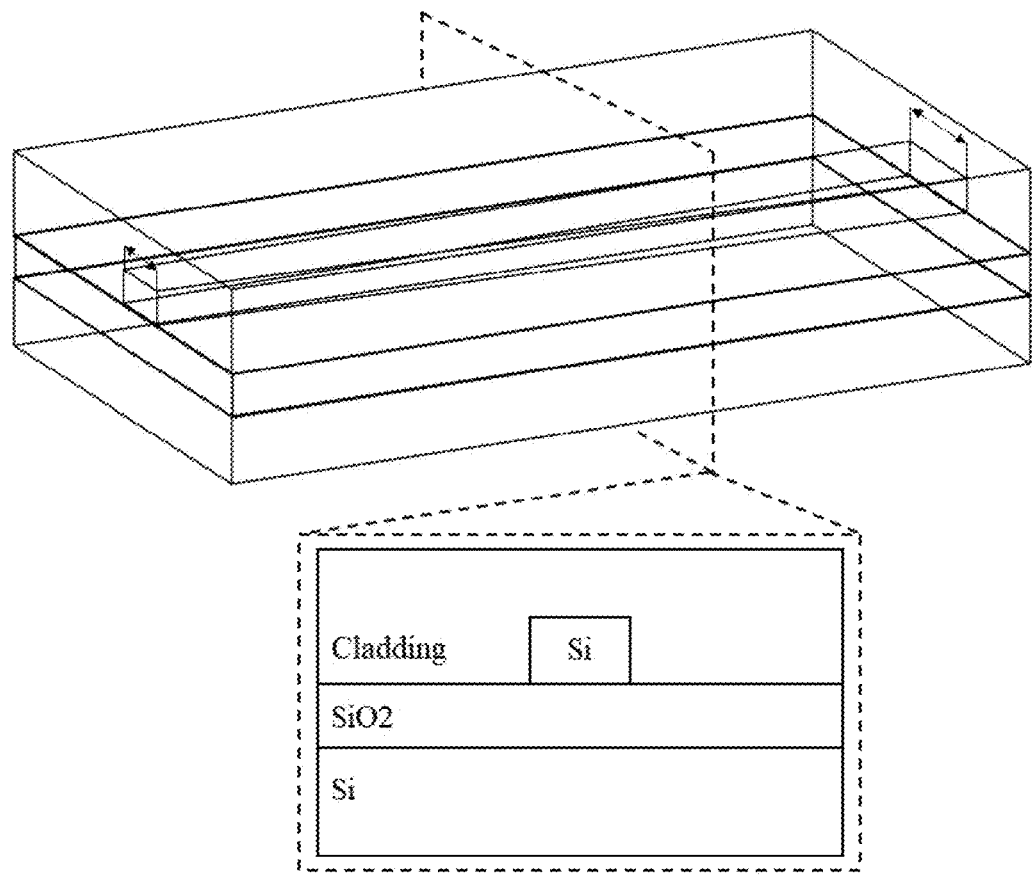
FIG. 3B shows the inverted cone coupler used in the optical phased array in the embodiment of the present invention and cross-section view of the inverted cone coupler along the dotted lines.

First, an optical signal is required to be coupled into an input waveguide of the optical phased array by a vertical grating coupler/inverse taper shown in FIG. 3A to 3B.

Figure 4:
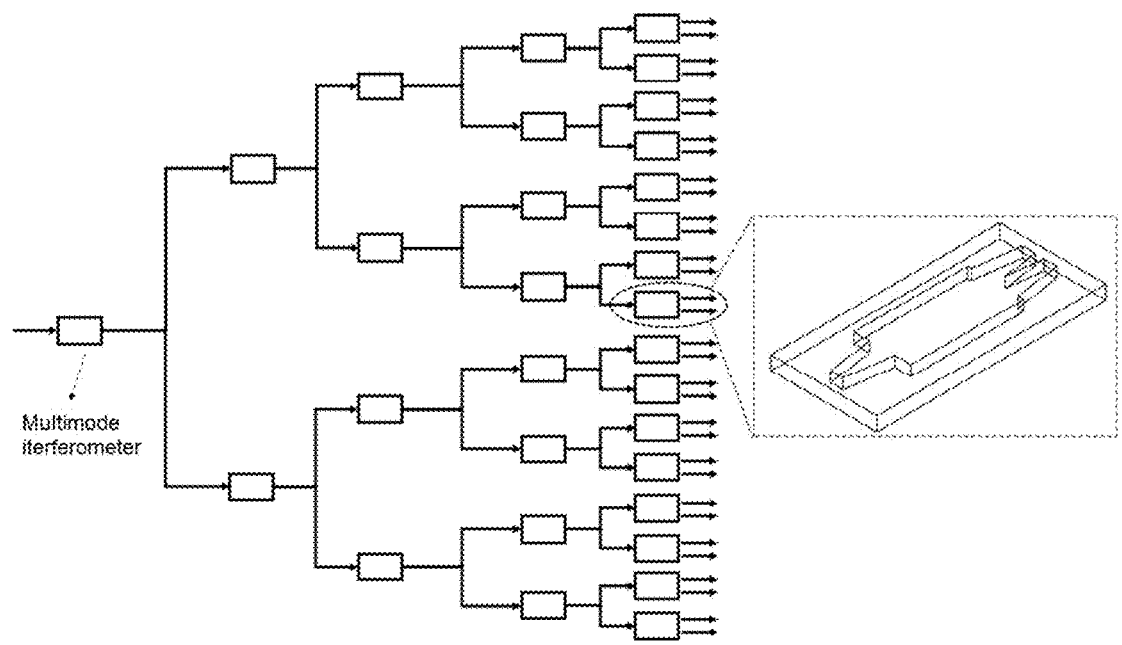
FIG. 4 shows the multimode interference coupler and the cascaded beam splitting structure for the optical phased array in the embodiment of the present invention

Next, the input waveguide performs N-channel uniform beam splitting via a cascaded beam splitting structure shown in FIG. 4.

Figure 5:
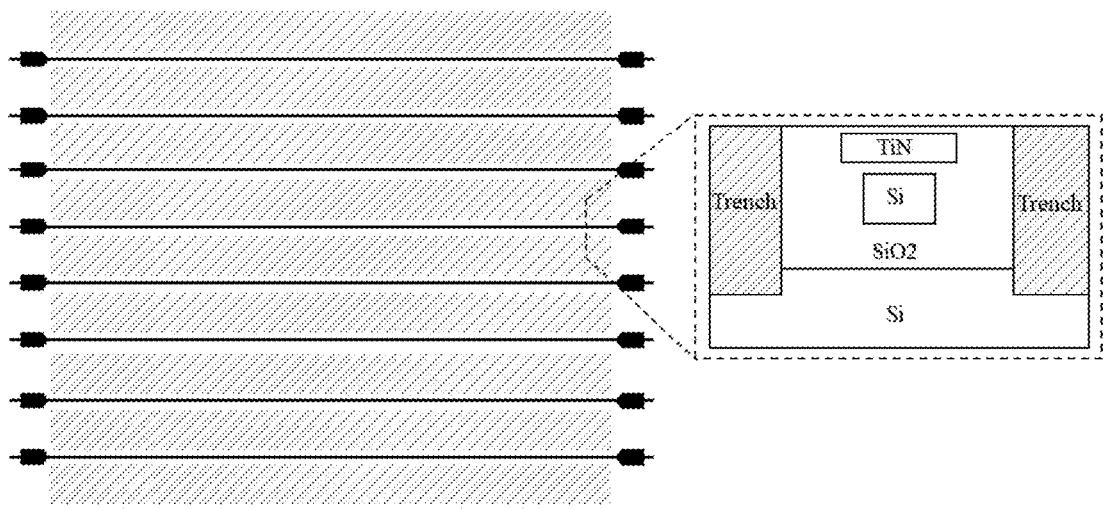
FIG. 5 is shows the metal microheater based phase shifter in accordance with the optical phased array in the embodiment of the present invention.

Then, the N paths of optical signals are subjected to phase adjustment by a phase shifter phase modulation array shown in FIG. 5. The phase modulation array is mainly used for effectively adjusting the phases of the N paths of light beams output by a beam splitter (phase modulation) to generate a fixed phase difference $\Delta\Phi$ among channels of the waveguide array. Effective deflection of far-field diffraction main lobe light beams is realized by adjusting the phase difference among the channels, changing angular distribution of a far-field interference pattern to form a wave beam with directivity so as to change the angle of the transmitting/receiving wave beam of the optical phased array.

Figure 6:
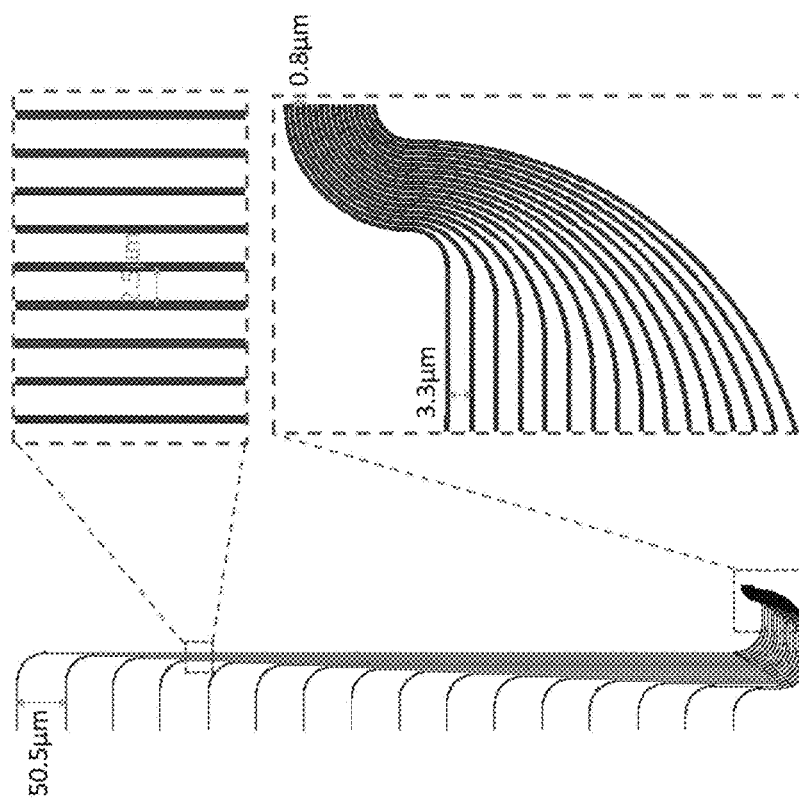
FIG. 6 shows the waveguide array antenna in the embodiment of the present invention.

After that, a light beam directionally transmitted in a certain direction is obtained by the output of the waveguide array antenna shown in FIG. 6 and enters the waveguide to perform multiple total reflection transmission according to a specific total reflection angle. At the end of the waveguide transmission, the light beam is received by the optical phased array receiving unit, with the principle same as that of the phased array transmitting unit, except that the optical path is reversed.

FIG. 3A is the overall structure diagram of the vertical grating coupler, including the grating, a section of straight waveguide, and a section of taper waveguide; and the inset is the grating structure, and FIG. 3B is the schematic diagram showing the three-dimensional structure diagram of the taper. Based on the above solution, the vertical grating coupler adopts the structure as shown in FIG. 3A in order to couple an optical signal into a transmission waveguide, wherein a silicon waveguide has a height of 220 nm, an etched grating has a height of 70 nm, a formed grating period is 630 nm, a duty ratio is 50%, and there are 27 grating periods. The silicon waveguide in the grating has a width of 12 μm and a length of 30 μm. In order to effectively transition the mode of a wide waveguide to a single-mode waveguide (500 nm wide), a segmented tapered (tapered) waveguide transition is required. The length of the tapered waveguide obtained by optimization is 200 μm. An optical fiber is incident at an angle of 8° and achieves good spot-size matching with the waveguide, so that high coupling efficiency is realized. Alternatively, the optical coupling can be also realized with an inverse taper, as shown in FIG. 3B. The silicon waveguide is also 220 nm in height. The waveguide tip width is around 120 nm and tapered to a single-mode waveguide (500 nm wide). Light is horizontally coupled to the inverse taper from a lens fiber. FIG. 3B also shows the cross-sectional view of the inverse taper.

Based on the above solution, an optical splitter is adopted as shown in FIG. 4. It is composed of 15 1×2 MMI couplers arranged as a four-stage binary tree structure and has 16 optical paths.

Based on the solution, the phase shifter adopts the metal microheater based phase shifter shown in FIG. 5, and air trenches are etched between adjacent waveguides so as to restrain thermal crosstalk between the waveguides and further reduce phase crosstalk between the waveguides. The metal used is titanium nitride (TiN), because the resistivity of the TiN metal is high, the TiN metal is suitable for generating heat as a heat source, the heat is conducted to a silicon waveguide by silicon oxide, and the effective refractive index of the waveguide is changed to generate a phase shift. In order to ensure that sufficient phase shift is generated, the TiN is designed to have a width of 2 μm and a thickness of 120 nm, and the length of the phase shifter is 400 μm. A strip single-mode silicon waveguide is arranged right below the TiN microheater. After voltage is applied to the 16-channel phase shifter, different phase shift amounts can be realized, so that the deflection angle of a light beam transmitted from the waveguide array antenna is finally controlled.

On the basis of the above solution, the waveguide output antenna adopts the structure as shown in FIG. 6. In order to transition the array waveguide from a wider pitch to a narrower pitch, the structure of two S-shaped transition sections has been designed in the present invention. It can be seen that an initial OPA pitch is 50.5 μm which is transited to an output array spacing of 3.3 μm by the first S-shaped transition (shown in an upper inset of FIG. 6), and is further shrunken to an array spacing of 0.8 μm by the second specially designed S-bend (shown in a lower inset of FIG. 6). The conventional design has an array spacing of 2.5 μm, and the spacing (much greater than a half wavelength) is limited by the optical coupling between the silicon waveguides, so that there are side lobes in the far field, limiting the effective deflection angle range of the main lobe light beam. By the subsequent design that a section of S-shaped waveguide bend transitions to an array spacing of only 0.8 μm, we have realized theoretically that there is no side lobe in the far field, and the scanning angle range of the main lobe beam is unlimited.

On the basis of the solution, different heat can be generated in the TiN microheater by adjusting the external voltage of the optical phased array transmitting unit, so that the effective refractive index of the waveguide is changed to generate a phase shift, regulating the angle of an optical signal entering the waveguide and changing the propagation optical path of the optical signal, and different delay amounts are generated. Specifically, the invention can realize large adjustable delay amount, has the advantages of simple structure and control and high integration level. It has potential application value in the fields of signal processing, microwave photonics, optical communication and the like.

It will be readily understood by those skilled in the same field of research or industry that the foregoing description are embodiments of the present invention and are not intended to limit the present invention. Any modifications, equivalent substitutions and improvements made in the spirit and principles of the invention shall be covered by the protection of the invention.

We claim:

1. A silicon-based and an optical phased array-based integrated optically adjustable delay line, comprising
    an optical phased array transmitting unit (101) comprising an output end,
    a slab waveguide transmitting unit (102) comprising a first end and a second end, and
    an optical phased array receiving unit (103);
    wherein the output end of the optical phased array transmitting unit (101) is connected with the first end of the slab waveguide transmitting unit (102), and the second end of the slab waveguide transmitting unit (102) is connected with the optical phased array receiving unit (103);
    the optical phased array transmitting unit (101) is sequentially composed of a coupler, a cascaded beam splitting structure, and a phase shifter phase array; and
    the optical phased array receiving unit (103) is sequentially composed of a phase shifter phase array, a cascaded beam splitting structure, and a coupler.

2. The integrated optically adjustable delay line according to claim 1, wherein the optical phased array transmitting unit (101) and the optical phased array receiving unit (103) are arranged symmetrically with respect to the slab waveguide transmitting unit (102) or at the same side of the slab waveguide transmitting unit (102).

3. The integrated optically adjustable delay line according to claim 1, wherein the optical phased array transmitting unit (101) transmits a wave beam having directivity by beam forming and is connected to the first end of the slab waveguide transmitting unit (102);
    an input light beam larger than a total reflection critical angle is constrained to be transmitted in the slab waveguide transmitting unit (102);
    the other end of the slab waveguide transmitting unit (102) is connected to the optical phased array receiving unit (103); and
    according to an optical path reversibility principle, the second end of the slab waveguide transmitting unit (102) receives an optical signal transmitted from a specific angle in the slab waveguide transmitting unit (102) so as to complete a connection of the optical path from the input to the output.

4. A method for adjusting light delay using the integrated optically adjustable delay line of claim 1, comprising
    regulating a phase difference between channels by the phase shifter phase array of the optical phased array transmitting unit (101) or the optical phased array receiving unit (103) to change a far-field interference light spot and forming a wave beam with directivity,
    changing an angle of a light beam of the optical phased array transmitting unit (101) or the optical phased array receiving unit (103),
    changing a length of a propagation path of the light beam in the slab waveguide; and
    adjusting the light delay.

5. The integrated optically adjustable delay line according to claim 1, wherein an input coupler of the optical phased array of the optical phased array transmitting unit (101) or the optical phased array receiving unit (103) adopts a grating coupler or an inverse taper, and an external signal that is an input and output through the coupler in the optical phased array transmitting unit (101) or the optical phased array receiving unit (103) adopts horizontal coupling or vertical coupling to realize a connection between an external optical signal and a planar optical waveguide; and
    the horizontal coupling adopts a lens, and an inverted cone spot-size converter on a chip, and the vertical coupling adopts a planar optical fiber, and a grating coupler on the chip.

6. The integrated optically adjustable delay line according to claim 1, wherein the cascaded beam splitting structure of the optical phased array transmitting unit (101) is a beam splitter that employs a cascaded multimode interference coupler, a cascaded Y-beam splitter, or a star coupler.

7. The integrated optically adjustable delay line according to claim 1, wherein the phase shifter of the optical phased array transmitting unit (101) or of the optical phased array receiving unit (103) adopts a phase shifter based on a free carrier dispersion effect or a phase shifter based on a thermo-optic effect.

8. The integrated optically adjustable delay line according to claim 1, wherein the optical phased array has a sub-wavelength spaced antenna density to enable a large angular range of non-aliased light beam deflection, and the transmit array uses a curved waveguide array, a waveguide array of different widths, or a photonic bandgap structure containing metamaterials to enable coupling suppression between transmit units.

9. The integrated optically adjustable delay line according to claim 1, wherein the optical phased array receiving unit comprises a mirror image structure with the optical phased array transmitting unit, and uses different array size, sub-channel number, sub-channel phase adjusting principle, beam combining device, output coupler, or a combination thereof from the optical phased array transmitting unit.

10. A method for increasing receiving efficiency or receiving integrated of the optically adjustable delay line according to claim 1, comprising increasing an array size of a receiver or the number of sub-channels in the optical phased array receiving unit (103).

* * * * *